United States Patent [19]
Kawakami

[11] Patent Number: 5,986,374
[45] Date of Patent: Nov. 16, 1999

[54] VEHICLE MOUNTED MOTOR WITH ROTOR HAVING FERRITE MAGNET SECTION WITH EMBEDDED PERMANENT MAGNET PIECES THEREIN

[75] Inventor: Tsukasa Kawakami, Obama, Japan

[73] Assignee: Shibaura Engineering Works Co., Ltd., Tokyo, Japan

[21] Appl. No.: 09/289,687

[22] Filed: Apr. 9, 1999

Related U.S. Application Data

[62] Division of application No. 09/091,941, filed as application No. PCT/JP96/02929, Oct. 9, 1996.

[30]    Foreign Application Priority Data

Jan. 18, 1996  [JP]  Japan ................................. 8-006416
Jan. 25, 1996  [JP]  Japan ................................. 8-010865
Jan. 25, 1996  [JP]  Japan ................................. 8-010866
Jan. 25, 1996  [JP]  Japan ................................. 8-010867
Jan. 25, 1996  [JP]  Japan ................................. 8-010868

[51] Int. Cl.$^6$ .................................................. H02K 21/12
[52] U.S. Cl. ............................ 310/156; 310/216; 310/261
[58] Field of Search .................................. 310/156, 152, 310/261, 157, 262, 216, 218; 360/99.08, 98.07, 99.04, 97.02, 596, 598

[56] References Cited

U.S. PATENT DOCUMENTS

| | | | |
|---|---|---|---|
| 2,961,555 | 11/1960 | Towne | 310/156 |
| 3,979,822 | 9/1976 | Halm | 29/596 |
| 4,127,786 | 11/1978 | Volkrodt | 310/156 |
| 4,131,988 | 1/1979 | Finegold | 29/596 |
| 4,625,135 | 11/1986 | Kasabian | 310/156 |
| 5,066,880 | 11/1991 | Banon | 310/156 |
| 5,397,951 | 3/1995 | Uchida et al. | |
| 5,563,463 | 10/1996 | Stark | 310/156 |
| 5,684,352 | 11/1997 | Mita et al. | 310/156 |
| 5,811,904 | 9/1998 | Tajima et al. | 310/156 |

FOREIGN PATENT DOCUMENTS 0 371 933 A1   6/1990   European Pat. Off. .

*Primary Examiner*—Thomas M. Dougherty
*Assistant Examiner*—Tran N Nguyen
*Attorney, Agent, or Firm*—Christensen O'Connor Johnson & Kindness PLLC

[57] ABSTRACT

A motor mounted in a vehicle having ferrite magnet section formed as a rotor core. The ferrite magnet section has a plurality of recesses, or through holes, circumferentially provided along an axial direction in a space-apart relation. A plurality of permanent magnet pieces are respectively fitted in the corresponding recess of the ferrite magnet section. The permanent magnet pieces are made of a permanent-magnetic material which has greater ferromagnetic property than that of the ferrite magnet section.

6 Claims, 11 Drawing Sheets

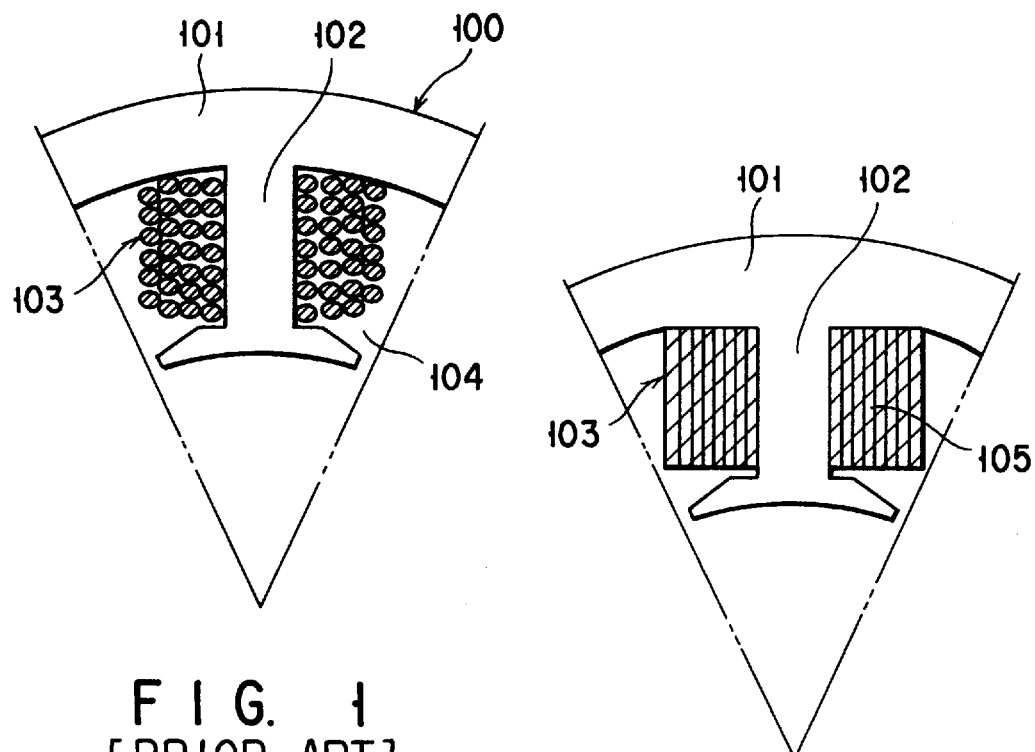
FIG. 1 [PRIOR ART]
FIG. 2 [PRIOR ART]
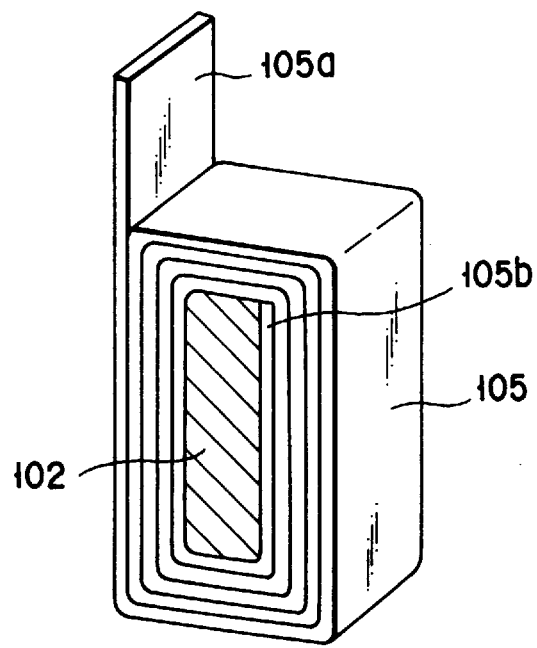
FIG. 3 [PRIOR ART]

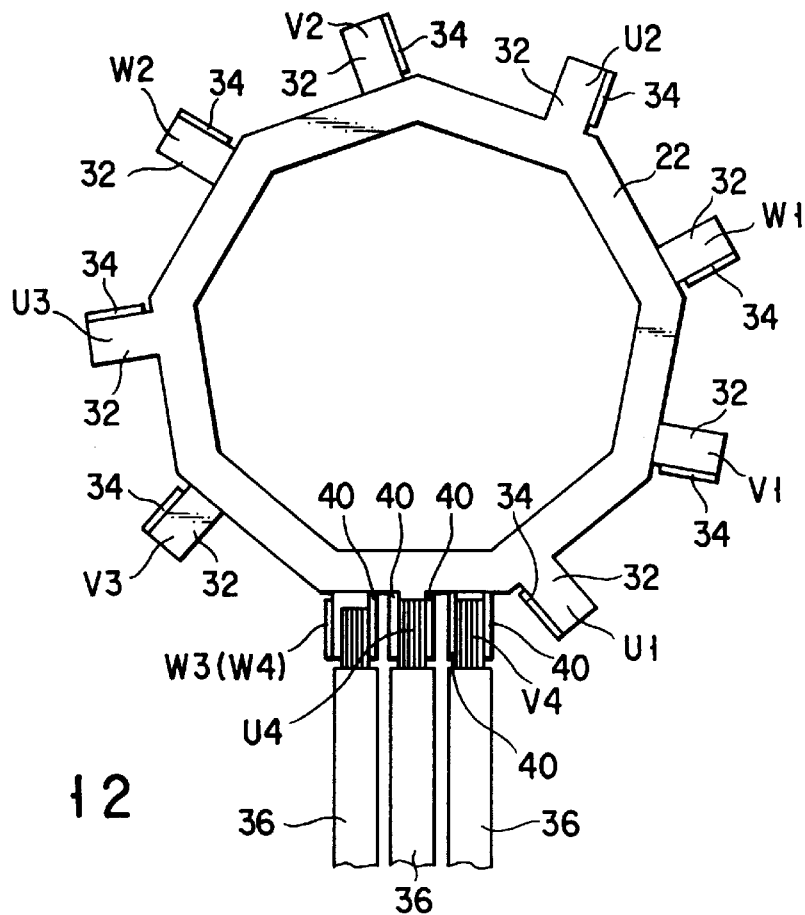
F I G. 12
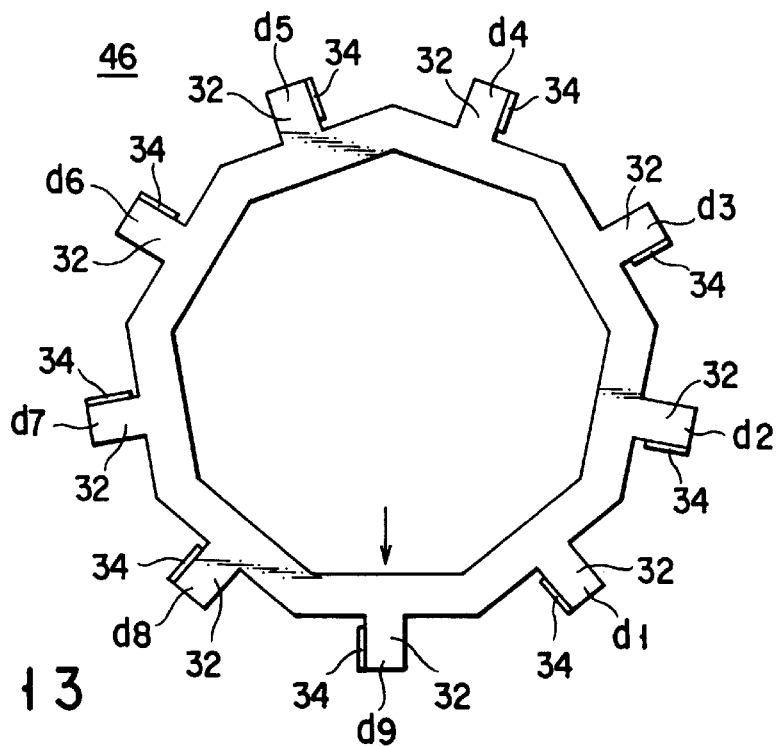
F I G. 13

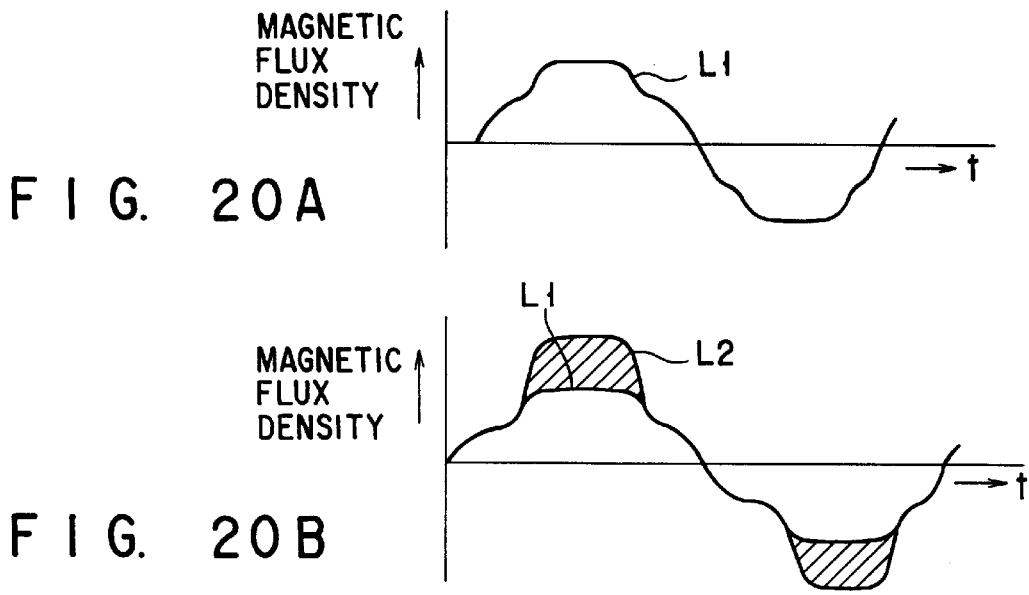
FIG. 20A
FIG. 20B
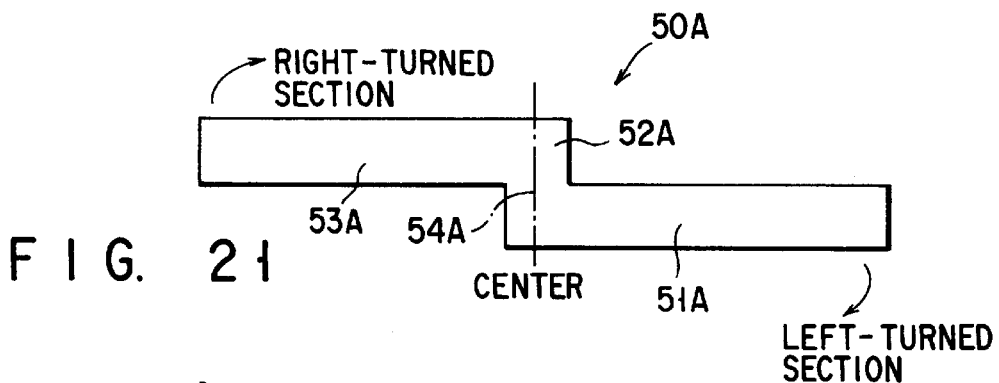
FIG. 21
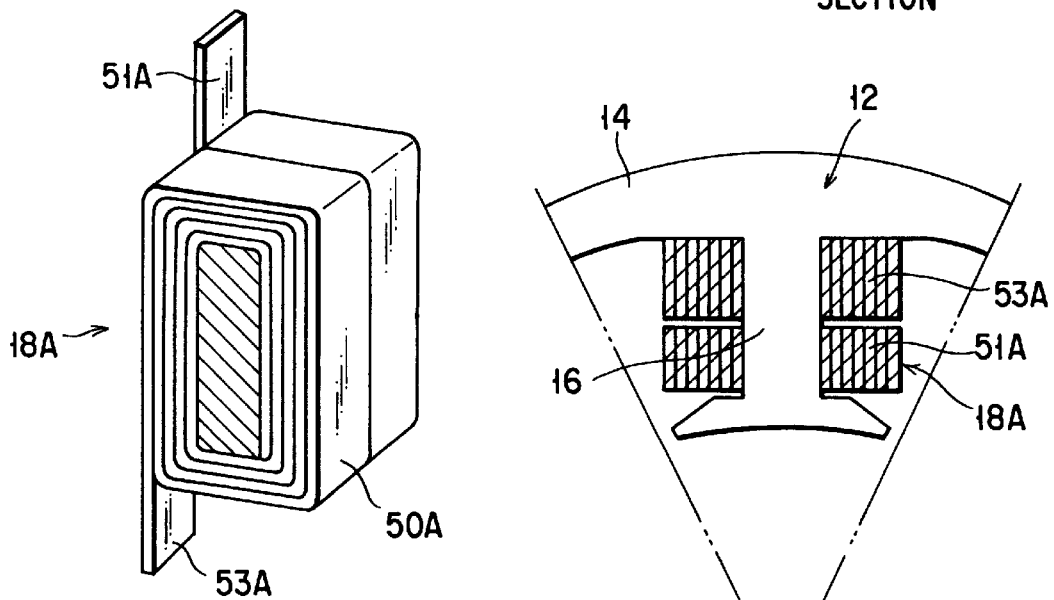
FIG. 22
FIG. 23

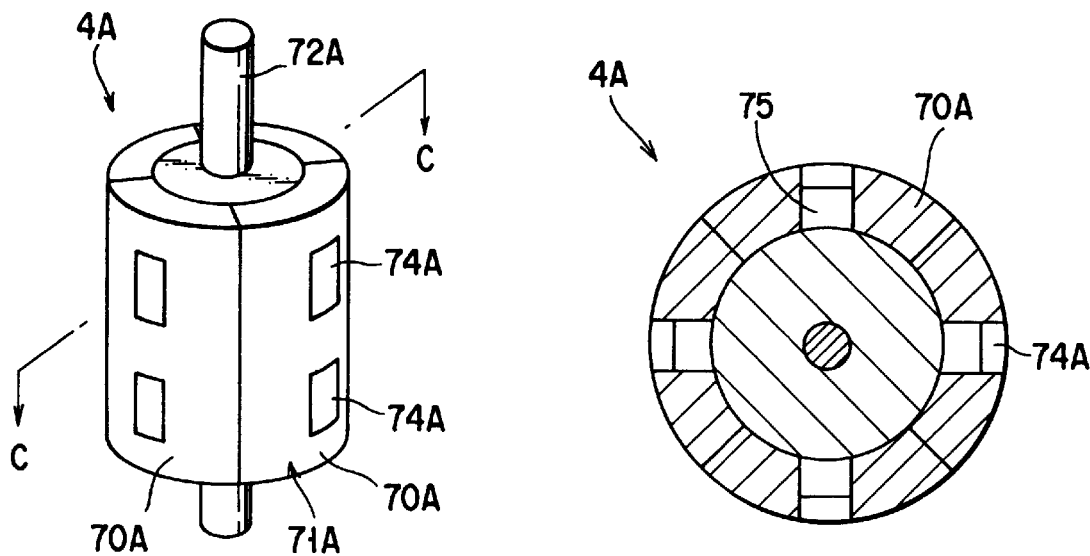
FIG. 24
FIG. 25
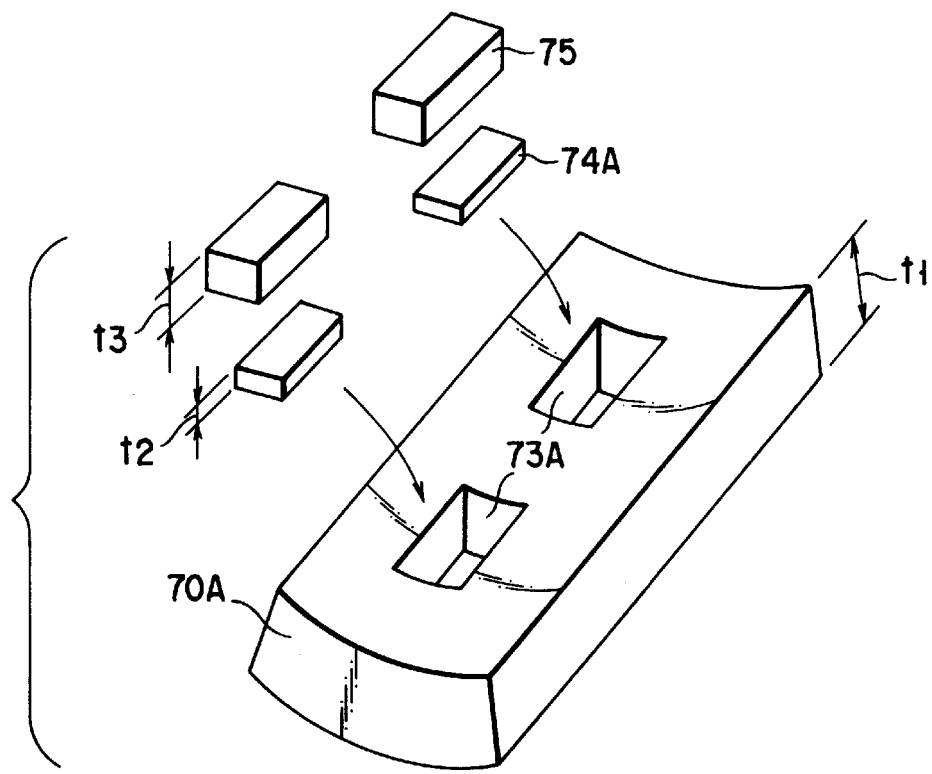
FIG. 26

5,986,374

VEHICLE MOUNTED MOTOR WITH ROTOR HAVING FERRITE MAGNET SECTION WITH EMBEDDED PERMANENT MAGNET PIECES THEREIN

This application is a divisional of U.S. patent application Ser. No. 09/091,941, filed Oct. 9, 1996, which is a U.S. national application corresponding to copending international application PCT/JP96/02929, filed Jun. 25, 1998, which designates the United States, the benefit of the filing dates of which is hereby claimed under 35 U.S.C. § 120, the international application in turn claiming the benefit of Japanese applications No. 8-006,416, filed Jan. 18, 1996; No. 8-010,865, filed Jan. 25, 1996; No. 8-010,866, filed Jan. 25, 1996; No. 8-010,867, filed Jan. 25, 1996; and No. 8-010,868, filed Jan. 25, 1996, the benefit of the filing dates of which is hereby claimed under 35 U.S.C. § 119.

TECHNICAL FIELD

The present invention relates to an electric motor mounted in a vehicle, such as a passenger car and truck.

PRIOR ART

In a vehicle such as a passenger car and truck, various motors are mounted such as a motor mounted on an engine and a motor for driving a wiper.

The motor mounted in the vehicle has a cylindrical stator and a rotor rotatably mounted at the central area of the stator in which the rotor is equipped with a permanent magnet and produces a rotational force under a magnetic field created by the stator.

In the stator of the motor mounted in the vehicle, use is made, as a structure for forming coils for creating magnetic fields, of cylindrical ring sections arranged coaxial with a rotor and a plurality of projections equidistantly mounted on, and along a circumferential direction of, the cylindrical ring unit and directed at their forward ends toward the rotor side with each projection wound with a winding such as a copper wire. A magnetic field is created by carrying electric current in the windings of these coils through lead wires from an external source.

In this case, the end of the winding constituting the coil is connected to the end of the lead wire in the following way. That is, the end of the winding is soldered to the end of the lead wire and the ends of the winding and lead wire are tied together by a band, etc., along the stator and fixed together and then bonded with a varnish, etc. They may also be connected and fixed through a PC board, etc.

If, as set out above, the end portions of the copper wire and lead wire are tied together and fixed or they are fixed together through the PC plate, there is sometimes a chance that their fixed areas are disconnected due to a vibration resulting from the running of the vehicle. As a result, the problem arises because of lowered vibration resistance and impact resistance in the vehicle. Further, for the former method it is necessary to tie together the end portions of the winding and lead wire during a manufacturing of the vehicle motor. This operation is time-consuming and tedious.

As shown in FIG. 1, on the other hand, a winding 104 is formed with a coil 103 provided around a projection 102 of a ring section 101 of a stator 100 and it may also constitute a winding 105 having a copper wire circular in cross-section or a length of a flat band-like copper wire as shown in FIG. 2.

For the winding 104 comprised of a copper wire as shown in FIG. 1, interstices are created among the adjacent copper wire portions and this presents the problem of the winding 104 being reduced in its space occupation percentage. For the winding 105 comprised of the flat band-like copper wire as shown in FIG. 2, there is less space between the adjacent band-like portions. For a winding 105 with one terminal end portion 105a of its turned section exposed to an outside as shown in FIG. 3, an initial end portion 105b is hidden at the inside of the turned section around a projection 102 and it is difficult to achieve the soldering of a lead wire's end portion externally.

The rotor, on the other hand, comprises a cylindrical section having a plurality of sector-like permanent magnet pieces formed of ferrite magnets and combined into a cylindrical unit and a rotation shaft fixed at the center of the cylindrical section.

Even if the motor in the vehicle is to be so made as to have high efficiency and high output level, the rotor using the ferrite magnet is limited in terms of the magnetic strength of the ferrite magnet. It may be possible to improve the magnetic strength using, for example, the rare earth magnet in place of the ferrite magnet. The rare earth magnet is higher in cost than the ferrite magnet and, if the rare earth magnet is used for the rotor of the motor in the vehicle, then the manufacturing cost becomes expensive.

DISCLOSURE OF THE INVENTION

An object of the present invention is to provide a motor mounted in a vehicle, which is excellent in its vibration resistance and in its impact resistance.

Another object of the present invention is to provide a motor mounted in a vehicle, which can improve a space occupation percentage and ensure ready connection of the end portions of a winding to external lead wires.

Another object of the present invention is to provide a motor mounted in a vehicle, which can ensure high efficiency and high output power through the effective use of a relatively hard-to-get magnet material.

The vehicle motor as set out in claim 1 of the present invention is comprised of a one-piece unit molded with a molding resin and having a stator, lead wires of coils in the stator and interconnect members connecting the lead wires to an outside of the vehicle motor.

The vehicle motor of claim 2 is of such a type that, in the arrangement of claim 1, the interconnect members comprise an electro-conductive layer section having a coil connection section and external terminal section and an insulating layer section stacked on the electro-conductive layer section and the lead wires of the coils are connected to the coil connection section and the lead wires are connected to the external terminal section.

The vehicle motor of claim 3 is of such a type that, in the arrangement shown in FIG. 2, the interconnect members are substantially ring-like in configuration, the coil connection section and external terminal section are projected from the outer periphery of the electro-conductive layer section, tape-like coils are wound on the stator and the lead wire of the tape-like coil is electrically connected to the coil connection section.

The vehicle motor is one piece molded with the molding resin and has a stator, coils and interconnect members and possesses excellent vibration resistance and impact resistance. Therefore, there is no chance of disconnection at an areas between the lead wires of the coils and the interconnect members. Thus, added reliability can be obtained on the motor mounted in the vehicle.

The vehicle motor according to claim 4 of the present invention is of such a type that the winding on the stator is comprised of a flat band-like copper wire and comprises a first band-like wire wound on the stator in a radially inward direction of the stator, a connection section continuous with one longitudinal end of the first band-like section and extending in a radially outward direction, and a second band-like section continuous with a radially outward end of the connection section, extending in a direction opposite to that of the first band-like section, and wound on the stator.

By doing so, the first and second band-like sections are wound at radially different areas on the stator with the connection section as a reference position. Their free end portions are each exposed to an outside, thus making it easier to make connection to the outside conductors. Since a flat band-like copper wire is used as the winding, there is no clearance between the adjacent turned portions of the coil and it is possible to improve a space occupation percentage of the winding.

In the invention as claimed in claim 5, the first and second band-like sections are wound on the stator in mutually opposite directions with a midpoint of the connection section as a reference position and, even in this case, it is possible to realize the above-mentioned advantage.

In the invention as claimed in claim 6, the second band-like section extends farther in length than the first band-like section.

By doing so, the first and second band-like sections are wound on the radially different areas of the stator with the connection section as a reference position. In the sector area of a unit angle from the center of the motor, the length of the circumferential area is greater toward the radially outward direction and the space size is increased. According to the winding of the present invention, the second band-like section situated toward the radially outward direction is made longer than the first band-like section situated toward the radially inward direction and the coil, thus provided, becomes thicker, in its turned portion, toward the radially outward direction. This provides a greater space occupation percentage to the winding. Further, the flat band-like copper wire is used as the winding and no clearance is produced at those areas between the turned portions of the coil and hence the winding provides an improved space occupation percentage. Further, both the free end portions of the winding are exposed to the outside, thus ensuring the easiness with which they are connected to external conductors.

The vehicle motor as claimed in claim 7 includes a rotor comprising a permanent magnet section formed as a cylindrical section, made of a ferrite magnet material and having a plurality of recesses circumferentially provided in a spaced-apart relation in an inner wall surface of the cylindrical section and magnet pieces greater in ferromagnetic property than a ferrite magnet material and each fitted in the corresponding recess in the permanent magnet.

As a result, the magnetic flux resulting from the permanent magnet has its density increased and it is possible to provide high efficiency and high output power to the motor. In view of the fact that a magnet material greater in ferromagnetic property than the ferrite magnet material is expensive and hard to get, the ferromagnetic material is partly used relative to the permanent magnet so that no greater extra cost is incurred in the manufacture of the vehicle motor and such a hard-to-get magnet material can be effectively used.

In the invention as claimed in claim 8, the permanent magnet section has a plurality of magnetic poles along its circumferential direction and a recess is provided at a middle of each magnetic pole. It is, therefore, possible to increase, in a proper timing, the density of a magnetic flux generated from the permanent magnet section.

The vehicle motor as claimed in claim 9 includes a rotor comprising a permanent magnet section formed as a cylindrical section from a ferrite magnet material and having a plurality of through holes circumferentially provided in its inner surface in a spaced-apart relation along an axial direction and magnet pieces greater in ferromagnetic property than the ferrets magnet material and each fitted in the corresponding through hole in the permanent magnet section.

In consequence, the magnetic flux generated from the permanent magnet section has its density increased and it is possible to achieve the vehicle motor of high efficiency and high output power. Even in the situation where the magnet material greater in ferromagnetic property than the ferrite magnet material is expensive and not readily available, such a ferromagnetic material is partly used in an effective way, so that the resultant motor involves no greater additional cost. It is, therefore, possible to obtain an otherwise relatively hard-to get magnet material readily.

Further, in the invention claimed in claim 10, the permanent magnet section has a plurality of magnetic poles along its periphery and the through holes are provided at the middle of the respective magnet and the magnetic flux created from the permanent magnetic section can have its density increased in a proper timing.

Further, in the invention as claimed in claim 11, the through hole is provided at a plurality of places along the axial direction of the permanent magnet section in a spaced-apart relation. In this case, less amount of magnetic piece can be used without incurring any large additional cost and it is possible to readily utilize the relatively hard-to-get magnet material effectively so that added advantage can be obtained.

In the invention as claimed in claim 12, the magnetic piece is made thinner than the permanent magnet section and a yoke made of a magnetic material is arranged in the radially inward direction of the magnetic piece. In this case, the amount of such magnetic piece can be reduced still further without incurring any greater additional cost and it is possible to readily and effectively use an otherwise relatively hard-to-get magnet material and to obtain added advantage.

BRIEF DESCRIPTION OF THE DRAWINGS

FIG. 1 is a cross-sectional view showing one example of the coil of a stator incorporated in a conventional vehicle motor;

FIG. 2 is a cross-sectional view showing another example of the coil of a stator incorporated in a conventional vehicle motor;

FIG. 3 is a perspective view showing the same type of conventional coil as set out above;

FIG. 12 is a plan view showing another interconnect member;

FIG. 13 is a plan view showing another interconnect member;

FIG. 20A is a waveform diagram for explaining the magnetic-characteristic of the vehicle motor using a ferrite magnet alone;

FIG. 20B is a waveform diagram for explaining the magnetic characteristic of the vehicle motor according to the embodiment of the present invention;

FIG. 21 is an expanded view showing a winding 50A in a first variant of the present invention;

FIG. 22 is a perspective diagram showing a coil;

FIG. 23 is a cross-sectional view showing a stator having a winding;

FIG. 24 is a perspective view showing a rotor 4A in a second variant of the present embodiment;

FIG. 25 is a cross-sectional view as taken along C—C in FIG. 24;

FIG. 26 is an exploded, perspective view of magnetic pieces in the rotor;

BEST MODE OF CARRYING OUT THE INVENTION

Figure 4:
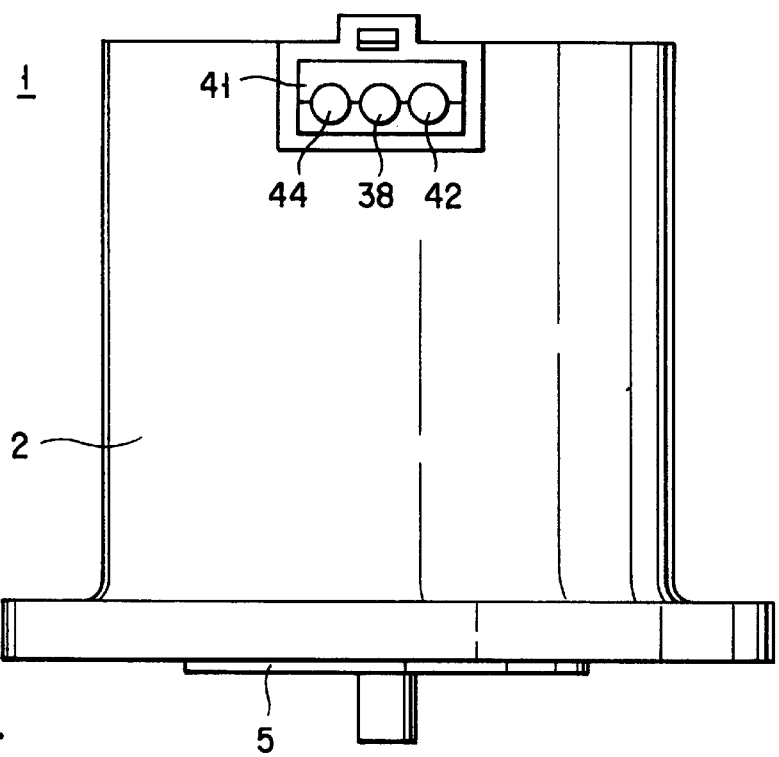
FIG. 4 is a front view showing a vehicle motor showing one embodiment of the present invention.

The embodiment of the present invention will be explained below with reference to the accompanying drawings. FIGS. 4 to 20 show one embodiment of the present invention.

The arrangement of a motor mounted in a vehicle will be explained below. The motor 1 is of such a type that it is mounted in the vehicle, for example, it is a 9-pole motor of three-phases, that is, a U-, V- and W-phase.

In a casing 2 of the motor 1, a stator 12 having a plurality of coils 18 and a rotor 4 are provided with an interconnect member 20 arranged above the stator 12 in FIG. 5 and having a structure as will be set out below. An interconnect member 46 is arranged below the stator 12 in FIG. 5 and has a structure as will be set out below. The casing 2 is covered with a cover plate 5 and the interconnect member 20 is connected to a lead wire 36 as will be set out below.

The stator 12 has a ring section 14 and nine projections 16 inwardly extending from the ring section 14. The projection 16 provides a T-shape configuration in plan view.

The upper end portion of the coil 18 (lead wire of the coil 18) comprised of a winding of a flat tape-like copper wire 18 and wrapped around each projection 16 of the stator 12 is brought out above the stator 12 and the lower end portion of the coil 18 (lead wire of the coil 18) is brought out below the stator 12.

Figure 6:
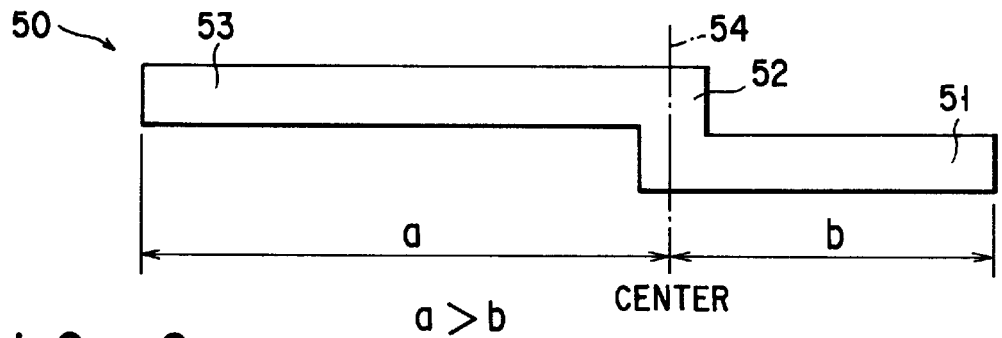
FIG. 6 is an expanded view of a winding.

A winding 50 comprised of a coil 18 will be explained below with reference to FIGS. 6 to 8. The winding 50 comprises a band-like section 51 of a length b as a first longitudinal band-like section, a connection section 52 continuous with one longitudinal end of the band-like section 51 and extending in a width direction of the band-like section 51 from said one longitudinal end and a band-like section 53 as a second longitudinal band-like section of a length a (a>b) having the same width as that of the band-like section 51 and extending, at its one end, continuous with the connection section 52. A middle line 54 bisecting the connection section 52 in a width direction is defined at a middle of the projection 16 of the stator 12 as viewed in a right/left direction of FIG. 8.

Figure 7:
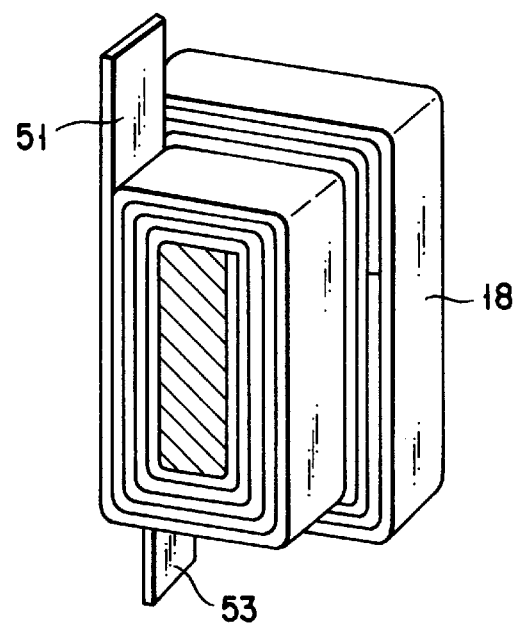
FIG. 7 is a perspective view of a coil.
Figure 8:
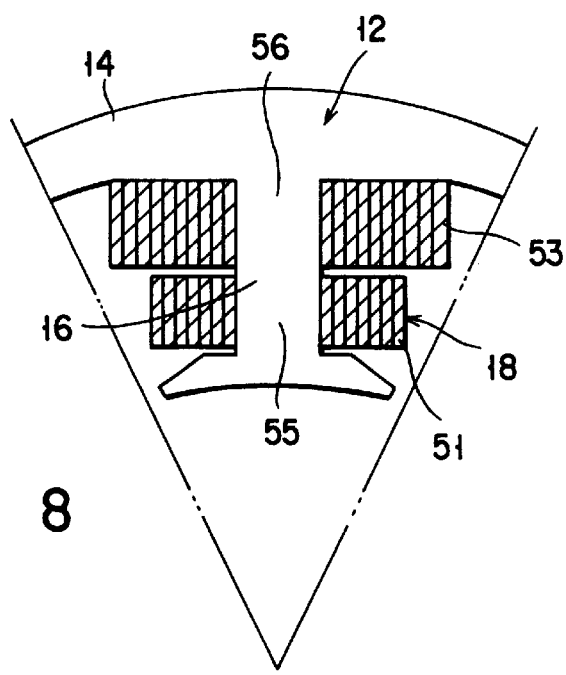
FIG. 8 is a cross-sectional view showing a major section of a stator having a winding.

As shown in FIG. 7, the band-like section 51 of the winding 50 is wound, as a left-turned section for instance, around a radially inward portion of the projection 16 and the band-like section 53 is wound, as a right-turned section for instance, around a radially outward portion of the projection 16. In consequence, the end portions of the band-like sections 51 and 53 are exposed to an outside of the coil 18 with the winding 50 as a turned section as shown in FIG. 7. In this case, for example, the end portion of the band-like section 51 is projected upwardly from the coil 18 and the end portion of the band-like section 53 downwardly from the coil 18.

Further, in a sector area of a unit angle range from the center of the motor mounted in the vehicle, the length of that circumferential portion becomes greater in a radially outward direction and the space size is increased. As shown in FIG. 8, however, the coil 18 in the winding 50 in the present embodiment is longer at the band-like section 53 than at the band-like section 51. For this reason, the projection 13 of the stator 12 is made thicker at the radially outward portion than at the radially inward portion 55. As a result, the coil 18 is so formed as to be thicker in its turned section in a radially outward direction. As a result, the space occupation percentage of the winding 50 is increased.

Figure 5:
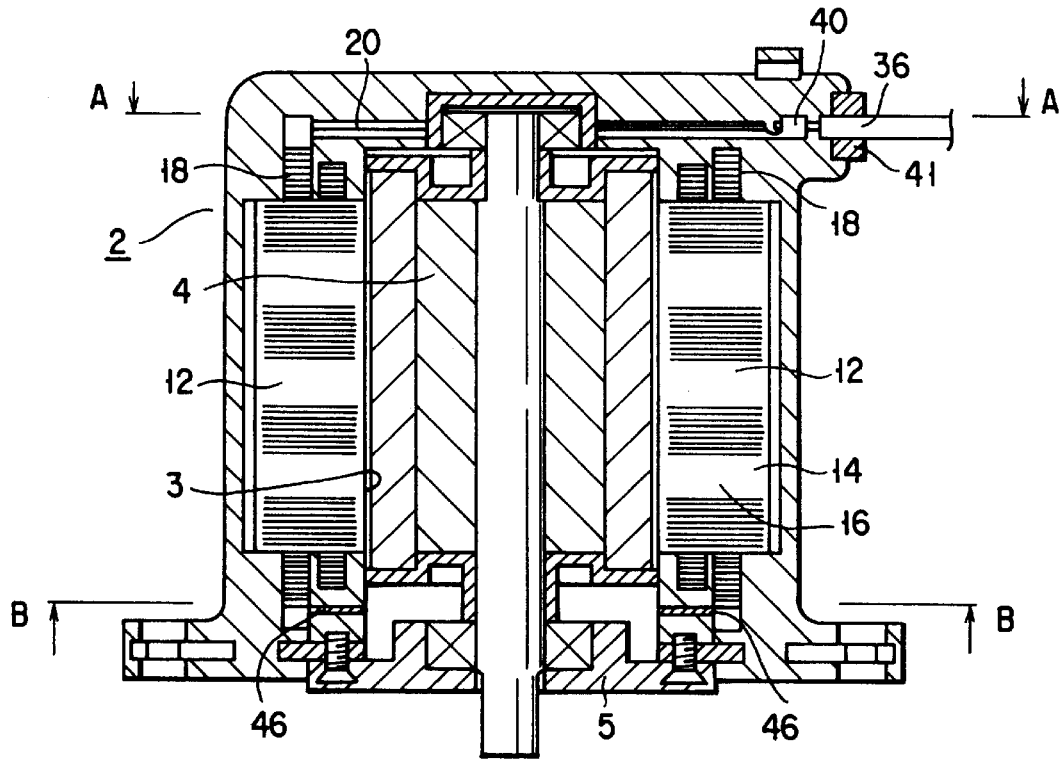
FIG. 5 is a vertical cross-section of the vehicle motor.
Figure 11:
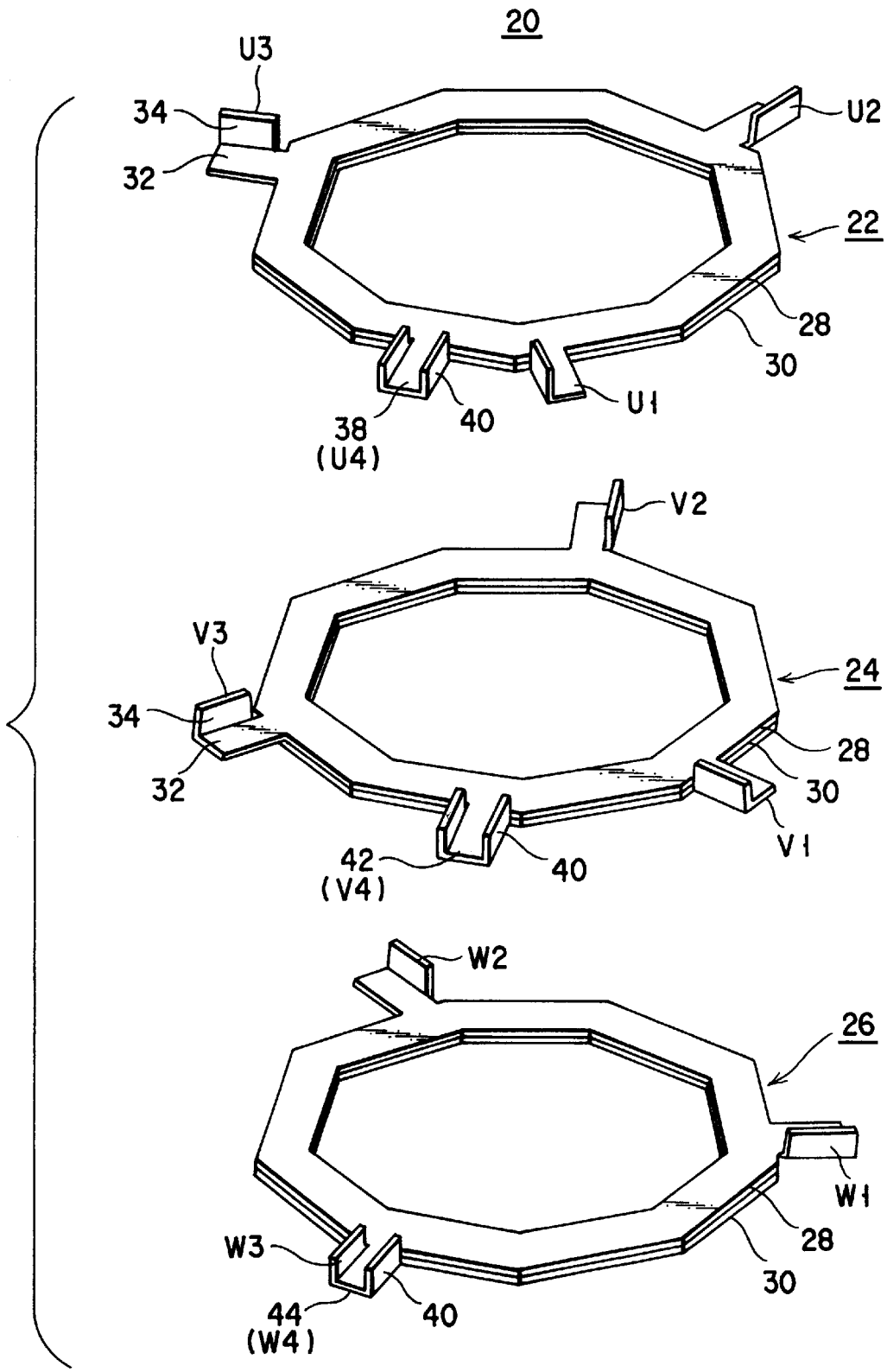
FIG. 11 is an exploded, perspective view showing an interconnect member.
Figure 14:
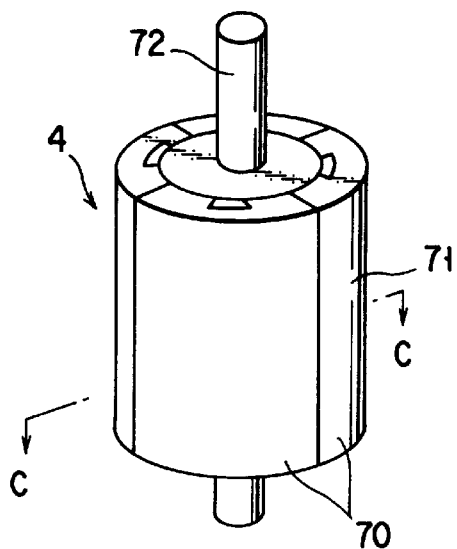
FIG. 14 is a perspective view showing a rotor in a motor mounted in a vehicle.
Figure 15:
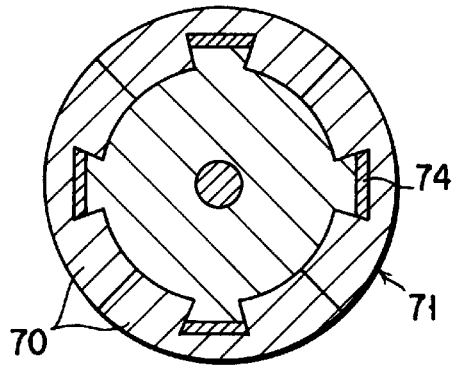
FIG. 15 is a cross-sectional view, as taken along line C—C in FIG. 14.

Reference numeral 20 of FIG. 5 shows an interconnect member arranged above the stator 12. The interconnect member 20 is comprised of, as shown in FIG. 11, a stacked structure of first, second and third connection plates 22, 24 and 26 of a regular nonagonal ring-like configuration with the first, second and third connection plates used for a U-, V- and W-phase, respectively.

First, explanation will be given below about the structure of the first connection plate 22. The first connection plate 22 comprises an electro-conductive layer 28 formed of a copper plate and an insulating layer 30 formed on the electro-conductive layer 28. On three of those sides of the regular nonagonal electro-conductive layer 28, projections U1, U2 and U3 are provided at respective 120 angle positions. The projections U1, U2 and U3 each comprise a horizontal piece 32 projected in a horizontal direction and an upright pieces 34 raised from the horizontal piece 32. Further, a first external terminal projection 38 is projected on one of the sides of the electro-conductive layer 28 to allow the connection of an external lead wire 36. Crimping portions 40, 40 are provided on the first external terminal projection 38 to allow the lead wire 38 to be crimped therewith (See FIG. 12).

The second connection plate 24 has substantially the same structure as that of the first connection plate 22 and has projections V1, V2 and V3 from three of its nine sides. The projecting positions of the projections V1, V2 and V3 are displaced relative to those of the counterparts of the first connection plate 22. Further, a second external terminal projection 42 is provided on the second connection plate (See FIG. 12).

The third connection plate 26 has substantially the same structure as the first connection plate 22 and has projections W1, W2 and W3 on three of its nine sides. The projecting positions of these projections W1, W2 and W3 are displaced from those of the counterparts of the first and second connection plates 22 and 24. Further, a third external terminal projection 44 serves also as the projection W3 (See FIG. 12).

The first, second and third connection plates 22, 24 and 26 are so stacked as to provide a stacked inconnect member 20.

Reference 46 in FIG. 13 shows a fourth connection plate (interconnect member) for a neutral point which is disposed below the stator 12. The fourth connection plate 46 has a regular nonagonal ring-like configuration and has projections dl to d9 each extending from a corresponding one of its sides.

Figure 16:
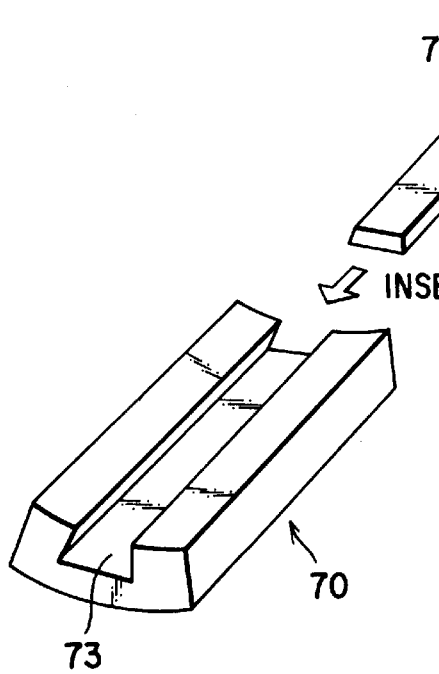
FIG. 16 is an expanded perspective view showing a magnet piece to be fitted in the rotor.

On the other hand, the rotor 4 is so formed as to include a cylindrical section 71 of a permanent magnet into which a plurality of sector-like ferrite-magnet pieces 70 are assembled and a rotation shaft 72 fixed at the center of the cylindrical section 71. In the respective magnet piece 70, as shown in FIG. 16, a groove 73 is formed in a middle inner wall position along an axial direction in such a way that, as a magnet piece 74, a magnet material such as the rare earth magnet greater in magnetic strength than the ferrite magnet is fitted in, and fixed to, the axial groove 73. The stator 12 is arranged around the rotor 4 and the rotor 4 is rotated through a rotational magnetic field in the stator 12.

The method for assembling the vehicle motor 1 in sequential steps will be explained below.

First, the interconnect member 20 is arranged above the stator 12 and the fourth connection plate 46 is arranged below the stator 12.

Figure 17:
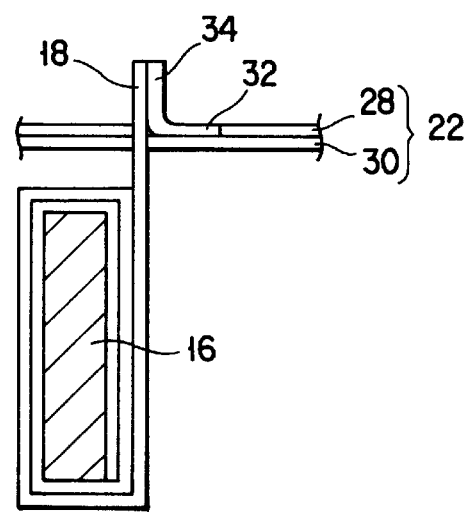
FIG. 17 is an explanatory view showing a state in which a coil is mounted around a projection.

Second, the upper end portion of the tape-like. coil 18 around the projection 16 of the stator 12 is welded to the projections U1, U2, U3, V1, V2, V3 and W1, W2 and W3. As shown in FIG. 17, the end portion of the coil 18 is exposed, as a tape-like portion, to an outside and welded to and along the upright piece 34 as shown in FIG. 7. By doing so, the coil 18 can be readily mounted to the interconnect member 22.

Third, the lower end portion of the coil 18 extending downwardly from the projection 16 is exposed as a tape-like portion to an outside as in the case of the upper end portion of the coil 18 and can readily be welded, as in the above case, to the respective places of the respective projections d1 to d9 of the fourth connection plate 46.

Figure 18:
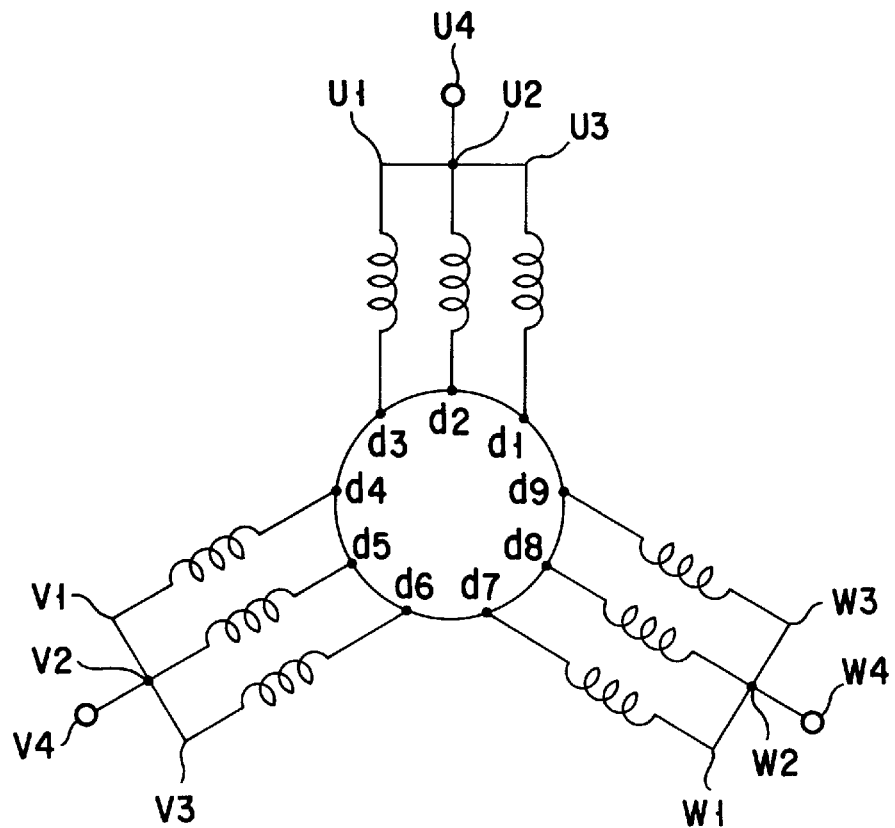
FIG. 18 is an electric connection diagram of the vehicle motor.

The interconnection of the respective coils 18 of the stator 12 is achieved along the arrangement of an electric circuit as shown in FIG. 18.

Fourthly, after the assembling of these components, the stator 12, coils 18, interconnect member 20 and fourth connection plate 46 are molded with a molding resin into an integral unit. By dosing so, a casing 2 is completed for the vehicle motor 1 and the forward end portions of the lead wires 36 have their crimped areas (crimped areas 40) mounted with a bush 41 to provide an integral molding unit.

Fifthly, after the completion of the casing 2, the rotor 4 is fitted into a cavity 3 in the casing 2 such that, by the cover plate 5, the rotor 4 is rotatably fixed to the casing 2 as shown in FIG. 5. In this case, the cover plate 5 is screwed to the casing 2.

Figure 9:
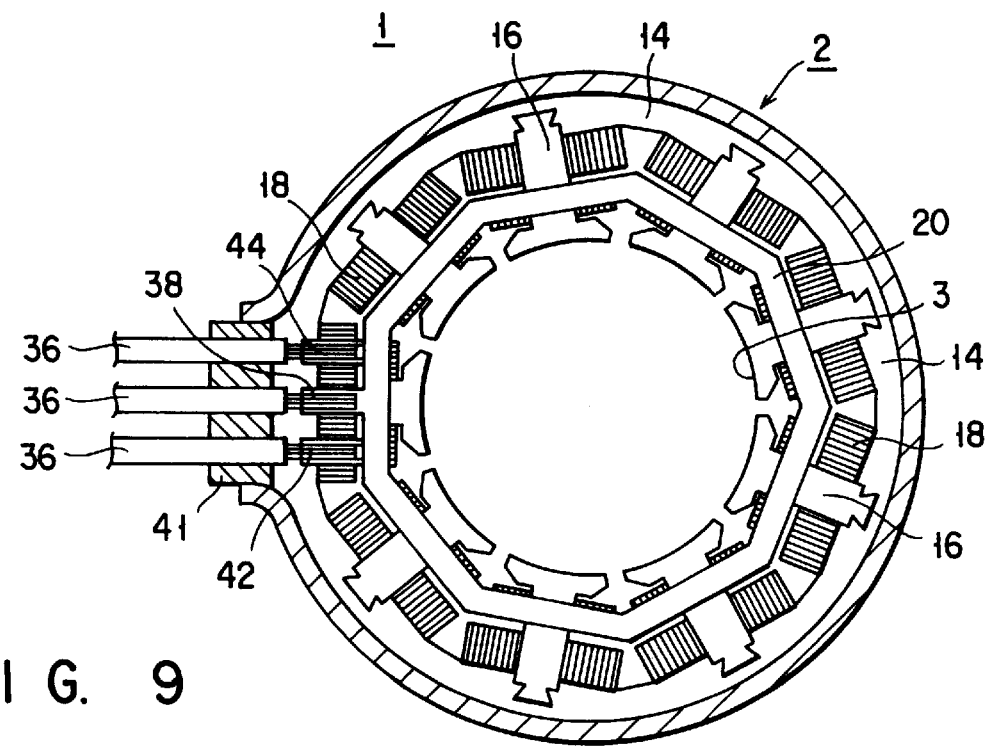
FIG. 9 is a cross-sectional view as taken along line A—A in FIG. 5.
Figure 10:
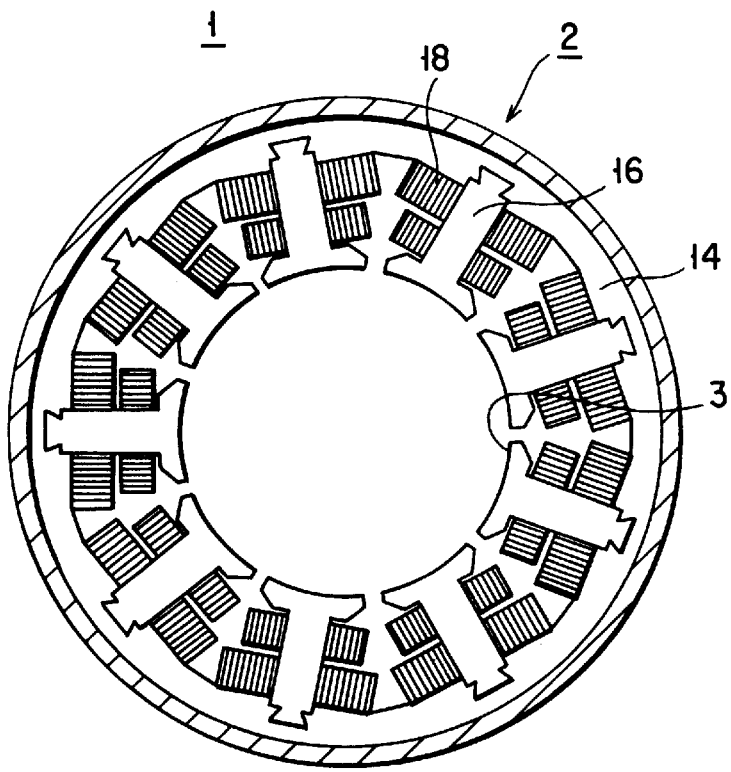
FIG. 10 is a cross-sectional view as taken along line B—B in FIG. 5.

Sixthly, as shown in FIG. 9 the lead wire 36 is mounted to the first external terminal projection 38 (U4 in the electric circuit in FIG. 18). This mounting is achieved with the use of the crimping portions 40 on the first external terminal projection 38 corresponding to U4. Similarly, the lead wire 36 is attached also to the second external terminal projection 42 (V4) and the lead wire 36 is, likewise, mounted to the third external terminal projection 44 corresponding to W4.

Figure 19:
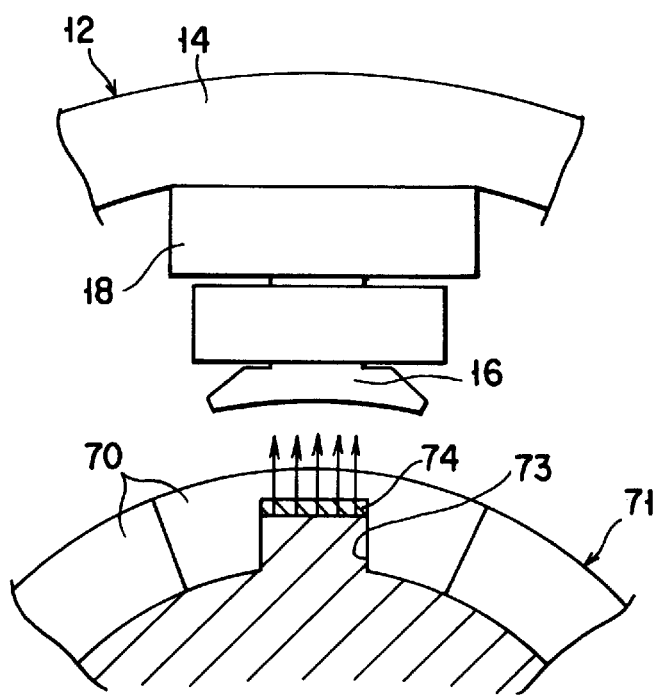
FIG. 19 is a cross-sectional view showing part of the vehicle motor.

Then, explanation will be given below about the magnetizing characteristic of the vehicle motor 1. The trace L1 in FIG. 20A shows the magnetizing characteristic of the rotor in the case of using a ferrite magnet alone and L2 in FIG. 20B shows the magnetizing characteristic of the rotor 4 of the present embodiment. FIG. 19 shows the cross-section of one portion of the vehicle motor for which the rotor 4 is used. As shown in FIG. 19, the magnetic flux generated from the rotor 4 is magnetically coupled to the respective projections 16 of the stator 12. In the rotor 4 having such an arrangement as set out above, it has been found that, at a position of the magnetic piece 74, the magnetic flux generated from the rotor 4 has its density increased over a conventional magnetic flux density, as shown in FIG. 20B, which is indicated by L1. In consequence, the magnetic flux generated from the rotor 4 has its density increased so that the vehicle motor 1 can be made to have a high efficiency and a high output power.

With the vehicle motor 1 according to the present invention, since the stator 12, interconnect member 20 and so on are molded with the molding resin into the integral unit, even when such a motor 1 is mounted in the vehicle, the interconnect section or sections are prevented from being disconnected by the vibration, etc., of the vehicle and it is possible to obtain excellent vibration resistance and impact resistance. Further, since the casing 2 of the vehicle motor 1 is molded with a molding resin, it is possible to promote a heat dissipation effect in the vehicle motor 1.

Further, the lower and upper end portions of the winding 50 constituting the coil 18 are exposed to an outside of the coil 18 and the connection operation of the interconnect members 20, 46 becomes easier. Since a flat band-like copper wire is used for the winding 50, no clearance is created between the turned portions of the winding 50 so that it is possible to improve the space occupation percentage of the winding 50.

Further, in the sector area of a unit angle range from the center of the vehicle motor 1, the length of the circumferential portion becomes longer in a radially outward direction and the space size is increased. As shown in FIG. 8, the coil 18 of the winding 50 in the present embodiment is so formed as to be made longer at the band-like section 51 than at the band-like section 53. For this reason, the thickness of the radially outward portion of the projection 13 of the stator 12 is greater than that of the radially inward section 55 thereof so that it is possible to increase the space occupation percentage of the winding 50.

Since use is made of the rare earth magnet stronger in ferromagnetic property than the ferrite magnet material, the density of a magnetic flux produced from the rotor 4 is increased so that the vehicle motor 1 can be made higher in its efficiency and its output power. In this case, although the rare earth magnet is higher in cost than the ferrite magnet material, it is partly used for the cylindrical section 56 so that it incurs no larger additional cost in the vehicle motor 1. As a result, the rare earth magnet not readily available in view of its high cost can be effectively used according to the present invention. For this reason, it is possible to manufacture the vehicle motor 1 at less cost by that extent.

A first variant of the above-mentioned embodiment will be explained below with reference to the drawings. In the present variant, a coil 18A is used in place of the coil 18 as shown in FIGS. 21 to 23.

A winding 50A constituting the coil 18A is comprised of a flat band-like copper wire and comprises a band-like section 51A as a first longitudinal band-like section, a connection section 52A continuous with one longitudinal end of the band-like section and extending in a width direction of the band-like section 51A from said one longitudinal end and a band-like section 53A as a second longitudinal band-like section having the same width as that of the band-like section 51A and extending, at its one end, continuous with the connection section 52A. A middle line 54A bisecting the connection section 52A in a width direction is defined at a middle of a projection 16 of the stator as viewed in a right/left direction of FIG. 23.

As shown in FIG. 22, the band-like section 51A of the winding 50A is wound, as a left turned section for instance, around a radially inward portion of the projection 16 and the band-like section 53A is wound, as a right-turned section for instance, around a radially outward portion of the projection 16. In consequence, the end portions of the band-like sections 51A and 53A are exposed to an outside of the coil 18A in the winding 50A as shown in FIG. 22. In this case, the end portion of the band-like section 51A is so formed as to be projected, for example, upwardly from the coil 18A and the end portion of the band-like portion 53A to be projected, for example, downwardly from the coil 18A.

Even in the present variant, the upper and lower end portions of the winding 50A constituting the coil 18A are exposed to an outside of the coil 18A and it is easier to achieve the connection operation of the interconnect members 20, 46 as set out above.

A second variant of the above-mentioned embodiment will be explained below with reference to the associated drawings. In the present variant, a rotor 4A is used, in place of the rotor 4 as shown in FIGS. 24 to 26.

The rotor 4A comprises a cylindrical section 71A of a permanent magnet section into which a plurality of sector-like magnet pieces 70A of a thickness t1 are assembled and a rotation shaft 72A fixed at the center of the cylindrical section 71A, the sector-like magnet piece being made of a ferrite magnet. In a middle position of the inner wall surface of the respective magnet piece 70A, two through holes 73 for example are formed at a given interval along the axis of the cylindrical section 71A and a magnet piece 74A of a thickness t2 (t1>t2) fitted in, and fixed to, the through hole and made of a magnetic material such as a rare earth magnet greater in magnetic strength than the ferrite magnet. A yoke 75 of a thickness t3 (t1>t3, t1=t2+t3) is fitted in the through hole in a radially inward direction relative to the magnet piece 54A and made of a magnetic material, such as iron. The stator 12 is arranged around the rotor 4A and allows the rotor to be rotated under a rotation magnetic field from the stator 12.

Figure 27:
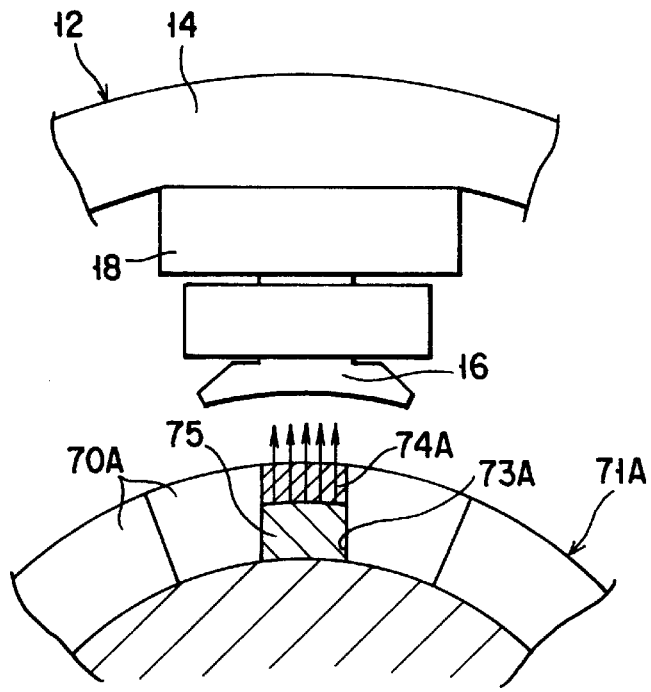
FIG. 27 is a cross-sectional view, as partly taken away, showing part of the vehicle motor.
Figure 28A:
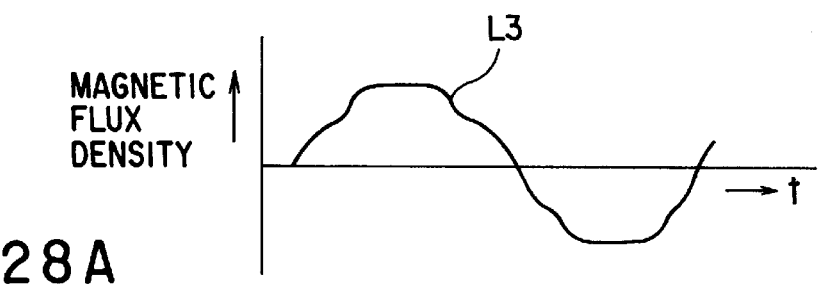
FIG. 28A is a waveform diagram for explaining the magnetic characteristic of the vehicle motor using a ferrite magnet.
Figure 28B:
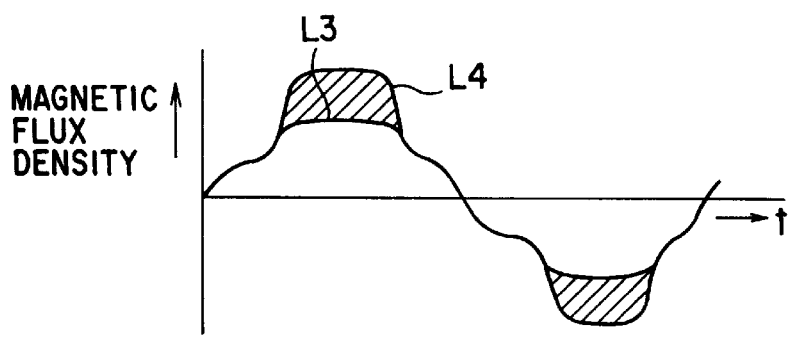
FIG. 28B is a waveform diagram for explaining the magnetic characteristic of the vehicle motor according to the variant of the present invention.

Explanation will be given below about the rotor 4A. The trace L3 in FIG. 28A shows the magnetic characteristic of the rotor when only the ferrite magnet is used and the L4 in FIG. 28B shows the magnetic characteristic of the rotor 4A in the present embodiment. FIG. 19 is a cross-sectional view, partly taken away, showing a portion of a vehicle motor 1 using the rotor 4A. As shown in FIG. 27, a magnetic flux created from the rotor 4A is magnetically coupled to the respective projection 16 of the stator 12. In the rotor 4A having the arrangement as set out above, it has been found that, at the position of the magnet piece 74A, the density of the magnetic flux created from the rotor 4A is increased over the line L3 representing the magnetic flux density of the prior art as shown in FIG. 20B.

Even in the present variant, the density of the magnetic density created from the rotor 4A is increased and it is possible to achieve the high efficiency and high output power on the vehicle motor. Further, although the rare earth magnet higher in ferromagnetic property than the ferrite magnet material is high in cost, since the magnet piece 74A made of the rare earth magnet is partly used simply to an extent to be fitted in the through hole 73A in the cylindrical section 71A, the use of it in the vehicle motor 1 incurs no greater extra cost and, further, it is possible to readily and effectively use the rare earth magnet relatively hard to get in terms of cost. Still further, the thickness t2 of the magnet piece 74A is made smaller than the thickness t1 of the magnet pieces 74A so that less amount of rare earth magnet can be used readily and effectively.

I claim:

1. A motor mounted in a vehicle, having a rotor comprising a permanent magnet section formed as a cylindrical section, made of a ferrite magnet material and having a plurality of recesses circumferentially provided along an axial direction in a space-apart relation in an inner surface of the cylindrical section and magnet pieces made of a permanent magnet material greater in ferromagnetic property than the ferrite magnet material and each fitted in the corresponding recess in the permanent magnetic section.

2. The motor according to claim 1, wherein the permanent magnetic section has a plurality of magnetic poles along its peripheral surface and the recess is provided at a middle of each magnetic pole.

3. A motor mounted in a vehicle, having a rotor comprising a permanent magnet section formed as a cylindrical section from a ferrite magnet material and having a plurality of through holes circumferentially provided in an inner surface in a spaced-apart relation along an axial direction and permanent magnet pieces greater in ferromagnetic property than the ferrite magnet material and each fitted in the corresponding through hole in the permanent magnetic section.

4. The motor according to claim 3, wherein the permanent magnet section has a plurality of magnetic poles along its circumferential surface and the through hole provided at a middle position of the magnetic pole.

5. The motor according to claim 3, wherein the through holes are provided at a plurality of places in a spaced-apart relation along the axial direction of the permanent magnet section.

6. The motor according to claim 3, wherein the magnet piece is made thinner than the permanent magnet section and a yoke made of a magnetic material and arranged in a radially inward direction.

* * * * *